US005589534A

United States Patent [19]

Metzger et al.

[11] Patent Number: 5,589,534
[45] Date of Patent: Dec. 31, 1996

[54] AQUEOUS COATING COMPOSITIONS INCLUDING A REACTIVE EMULSIFIER

[75] Inventors: Carl W. Metzger, Denkendorf; Bernhard H. Feith, Markgroningen; Ute Gruber, Remchingen; Angelika A. Zedler, Stuttgart, all of Germany; Mario M. M. van Wingerde, Roosendaal, Netherlands

[73] Assignee: Akzo Nobel N.V., Netherlands

[21] Appl. No.: 179,297

[22] Filed: Jan. 10, 1994

Related U.S. Application Data

[63] Continuation of Ser. No. 39,383, filed as PCT/EP91/02007, Oct. 16, 1991, abandoned.

[30] Foreign Application Priority Data

Oct. 16, 1990 [EP]  European Pat. Off. ............. 90202769

[51] Int. Cl.⁶ ..................................................... C08L 37/00
[52] U.S. Cl. ......................... 524/548; 523/402; 523/403; 523/404; 523/410; 523/411; 523/412; 523/414; 523/415; 524/458; 524/502; 524/529; 524/531; 524/533; 524/535; 524/553; 524/555; 524/556; 524/558; 524/559
[58] Field of Search .................................... 524/502, 243, 524/458, 548, 558, 559, 555, 556, 529, 531, 533, 535, 553; 523/402, 403, 404, 410, 411, 412, 414, 415

[56] References Cited

U.S. PATENT DOCUMENTS

| | | | |
|---|---|---|---|
| 2,634,245 | 4/1953 | Arndt | 106/252 |
| 3,291,775 | 12/1966 | Holm | 528/121 |
| 3,379,548 | 4/1968 | Jen | 106/245 |
| 3,945,964 | 3/1976 | Hastings et al. | 523/406 |
| 3,979,346 | 9/1976 | Zuckert et al. | 106/252 |
| 4,028,313 | 6/1977 | Muller et al. | 528/69 |
| 4,089,699 | 5/1978 | Blackburn et al. | 524/505 X |
| 4,145,248 | 3/1979 | Van Eenem | 162/163 |
| 4,221,685 | 9/1980 | Eschwey et al. | 106/252 |
| 4,233,194 | 11/1980 | Eschwey et al. | 528/163 |
| 4,303,563 | 12/1981 | Emmons et al. | 525/257 |
| 4,315,044 | 2/1982 | Elmore et al. | 427/386 |
| 4,318,832 | 3/1982 | Zabrocki et al. | 523/402 |
| 4,321,305 | 3/1982 | Castellucci et al. | 428/418 |
| 4,352,898 | 10/1982 | Albers | 523/414 |
| 4,373,008 | 2/1983 | Emmons et al. | 428/413 |
| 4,382,102 | 5/1983 | Noomen et al. | 427/54.1 |
| 4,408,018 | 10/1983 | Bartman et al. | 525/300 |
| 4,414,250 | 11/1983 | Costanza et al. | 427/386 |
| 4,530,946 | 7/1985 | Kanda et al. | 524/502 X |
| 4,590,101 | 5/1986 | Knapczy | 427/350 |
| 4,598,108 | 7/1986 | Hoefs | 523/411 |
| 4,602,061 | 7/1986 | Akkerman et al. | 525/10 |
| 4,608,406 | 8/1986 | Williams et al. | 523/424 |
| 4,687,814 | 8/1987 | Chaumont et al. | 525/242 |
| 4,702,844 | 10/1987 | Flesher et al. | 524/555 X |
| 4,737,530 | 4/1988 | Hoefs et al. | 523/414 |
| 4,740,546 | 4/1988 | Masuda et al. | 524/555 X |
| 4,749,592 | 6/1988 | Gasper et al. | 524/555 X |
| 4,772,680 | 9/1988 | Noomen et al. | 528/229 |
| 4,792,343 | 12/1988 | Haude et al. | 524/555 X |
| 4,871,822 | 10/1989 | Brindopke et al. | 526/271 |
| 4,921,902 | 5/1990 | Evani et al. | 524/555 |
| 4,929,661 | 5/1990 | Noomen et al. | 524/259 |
| 4,981,944 | 1/1991 | Bartels et al. | 528/220 |
| 4,990,577 | 2/1991 | Noomen et al. | 525/454 |
| 5,011,994 | 4/1991 | Bariels et al. | 564/278 |
| 5,021,544 | 6/1991 | Padget et al. | 528/272 |
| 5,066,710 | 11/1991 | Simon et al. | 524/555 |
| 5,095,066 | 3/1992 | Meixner et al. | 524/500 |
| 5,140,057 | 8/1992 | Saeki et al. | 524/237 |
| 5,141,874 | 8/1992 | Anderson et al. | 524/458 X |
| 5,219,900 | 6/1993 | Davies et al. | 524/458 X |
| 5,244,737 | 9/1993 | Anderson et al. | 524/458 X |

FOREIGN PATENT DOCUMENTS

| | | |
|---|---|---|
| 662337 | 1/1966 | Australia . |
| 822478 | 6/1988 | Australia . |
| 067625 | 12/1982 | European Pat. Off. . |
| 156657 | 10/1985 | European Pat. Off. . |
| 262720 | 4/1988 | European Pat. Off. . |
| 355892 | 2/1990 | European Pat. Off. . |
| 378265 | 7/1990 | European Pat. Off. . |
| 401898 | 12/1990 | European Pat. Off. . |
| 2455896 | 6/1978 | Germany . |
| 3900257 | 7/1990 | Germany . |
| 4036984 | 5/1991 | Germany . |
| 146968 | 6/1987 | Japan . |
| 2100271 | 12/1982 | United Kingdom . |
| 8400169 | 1/1984 | WIPO . |

OTHER PUBLICATIONS

International Search Report, dated Mar. 12, 1992.

Primary Examiner—Judy M. Reddick
Attorney, Agent, or Firm—Loretta A. Miraglia; Louis A. Morris

[57] ABSTRACT

An aqueous coating composition is provided which comprises a generally lipophilic crosslinkable binder, optionally a chemical curing/crosslinking agent for the crosslinkable binder, and a special reactive amphiphatic emulsifier comprising a lipophilic backbone having separately pendant therefrom (a) at least one activated unsaturated group and (b) at least one of a specified class of hydrophilic polyoxyalkylene groups, and possessing an HLB value of at least 6.0.

19 Claims, No Drawings

“5,589,534”

AQUEOUS COATING COMPOSITIONS INCLUDING A REACTIVE EMULSIFIER

CROSS REFERENCE TO RELATED APPLICATIONS

This application is a continuation of U.S. application Ser. No. 08/039,383, filed Apr. 16, 1993, now abandoned, which is the national stage of international application PCT/EP91/02007, filed Oct. 16, 1991.

BACKGROUND OF THE INVENTION

The present invention relates generally to aqueous coating compositions comprising generally lipophilic, crosslinkable binders which are dispersed in an aqueous medium with the aid of a special oligomeric/polymeric amphiphatic reactive emulsifying agent.

Coating compositions comprising generally lipophilic, crosslinkable binders are well-known in the art. Because the binders are lipophilic, these coating compositions are most readily formulated as organic solvent based systems. Increasingly stringent health/safety and environmental legislation, however, is making the use of organic solvents an expensive and unfashionable option for the coatings industry. As such, the industry is intensively seeking waterborne alternatives to their long-standing and commercially successful organic solvent based products; however, it has been difficult at best to make the switch to water without significant loss of coating stability and/or resulting film quality.

One pursued option has been to render the lipophilic binders water-dilutable (so-called "self-emulsifying" resins). This can and has been done, for example, by building hydrophilic functionality into a polymeric backbone or by providing a polymer structure wherein this hydrophilic functionality is made pendant to such polymeric backbone. See, for example, U.S. Pat. No. 2,634,245, U.S. Pat. No. 3,379,548, U.S. Pat. No. 4,028,313, U.S. Pat. No. 4,315,044, U.S. Pat. No. 4,321,305, U.S. Pat. No. 4,608,406, U.S. Pat. No. 5,021,544 and EP-A-0355892. These self-emulsifying resins, however, generally possess a relatively large total number of hydrophilic groups which tends to render the resulting films somewhat water sensitive.

In order to overcome these disadvantages, attempts have been made to disperse these lipophilic binders in water with the aid of apart dispersing agents. For example, U.S. Pat. No. 4,352,898, U.S. Pat. No. 4,598,108, U.S. Pat. No. 4,737,530, U.S. Pat. No. 4,929,661 and EP-A-0262720 disclose the use of relatively low molecular weight organic compounds as dispersing agents. The described aqueous coating compositions, while satisfactory in many respects, may still require the use of significant amounts of organic cosolvent. Additionally, the described dispersants may evaporate and contribute to the overall VOC, and what dispersant remains in the resulting film tends to act as an undesirable hydrophilic center.

Relatively higher molecular weight surfactants have also been used. For example, U.S. Pat. No. 3,945,964, U.S. Pat. No. 4,318,832 and WO84/00169 describe the use of various non-ionic (e.g., polyoxyalkylene) and anionic surfactants. The described surfactants, however, are generally non-reactive and, while solving certain disadvantages of the lower molecular weight organic compounds, have a stronger tendency to remain as undesirable hydrophilic centers in the resulting films.

In still a further attempt to overcome the problems associated with the above-referenced systems, it has been proposed to use surfactants which become bound into the film structure during the crosslinking reaction. Such "reactive" emulsifiers have been described, for example, in AU-A-82247/87, GB-A-2100271, DE-OS-2455896, DE-OS-3900257, U.S. Pat. No. 3,979,346, U.S. Pat. No. 4,221,685 and U.S. Pat. No. 4,233,194.

SUMMARY OF THE INVENTION

An especially advantageous reactive emulsifier of this type has now been found which can be utilized to formulate aqueous coating compositions of generally lipophilic, crosslinkable binders without the need for significant amounts of either organic cosolvent or volatile amines, the latter being generally used to render acid group-containing (anionic) components water-dilutable.

These goals are accomplished, in part, through the use of a special reactive amphiphatic emulsifier which comprises a lipophilic backbone having separately pendant therefrom:

(a) at least one activated unsaturated group; and
(b) at least one hydrophilic polyoxyalkylene group selected from
  (1) a polyoxyalkylene monoalkylether group of the general formula (I)

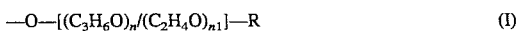

and
  (2) a polyoxyalkylene monoamine monoalkylether group of the formula (II)

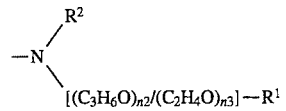

wherein R is selected from a $C_1$ to $C_4$ alkyl group,
$R^1$ is selected from an H atom and a $C_1$ to $C_4$ alkyl group,
$R^2$ is selected from (i) an alkyl group having 1 to 20 carbon atoms, (ii) the residue of a hydrocarbon having 1 to 20 carbon atoms and a group reactive with a nitrogen, and (iii) a polyoxyalkylene monoether group of the general formula (III)

$R^3$ is selected from a $C_1$ to $C_4$ alkyl group,
n, n2 and n4 are independently 0 to 25,
n1 is 4 to 40 and
n3 and n5 are independently 0 to 40,
with the proviso that n+n1≦50, 4≦n2+n3+n4+n5≦50 and n3+n5≧4;

the reactive amphiphatic emulsifier having an hydrophilic-lipophilic balance (HLB) value of at least about 6.

In accordance with the present invention, therefore, there is provided an aqueous coating composition comprising (A) a generally lipophilic, crosslinkable binder, (B) optionally, a chemical curing/crosslinking agent for the crosslinkable binder and (C) an emulsifying agent, characterized in that the emulsifying agent comprises the above-described reactive amphiphatic emulsifier. An amphiphatic emulsifier contains molecules which are partly hydrophilic, the other part containing straight or branched long hydrocarbon chains, See, e.g. *Grant & Hackh's Chemical Dict.*, 5th Edition, page 36.

The use of these reactive amphiphatic emulsifiers in accordance with the present invention alleviates some of the problems associated with the self-emulsifying resins because this option allows a more optimum total number of hydrophilic groups. In addition, some of the problems of the higher molecular weight non-reactive and lower molecular weight emulsifying agents are alleviated because the reactive emulsifier is bound into the final crosslinked polymer network.

A surprising advantage of the use of these reactive amphiphatic emulsifiers in accordance with the present invention is that aqueous coating systems can be formulated based upon a wide variety of generally lipophilic binder polymers, which aqueous coating compositions retain the desirable benefits of their organic solvent based counterparts including good solvent (both organic and aqueous) resistance as well as good corrosion resistance. The need for significant amounts of organic cosolvent, therefore, is alleviated.

These and other features and advantages of the present invention will be more readily understood by those skilled in the art from a reading of the following detailed description.

DETAILED DESCRIPTION OF THE PREFERRED EMBODIMENTS

As mentioned above, the aqueous coating compositions in accordance with the present invention are based in part upon generally lipophilic crosslinkable binders.

By "generally lipophilic" it is meant that the binder is substantially non-dilutable in water. The binder, however, may contain or be based upon components which in and of themselves are water-dilutable as long as the binder itself essentially is not.

"Crosslinking" is a concept well-known to those skilled in the relevant art. Crosslinking, of course, refers to chemical drying as opposed to physical drying (mere solvent evaporation), although both can play significant roles in ultimate film-formation. Crosslinking functionality in coatings compositions is varied and again generally known to those skilled in the relevant art.

For use with the present invention, the crosslinking functionality of the generally lipophilic binders must be capable of reacting under the same conditions as the activated unsaturated group(s) of the reactive amphiphatic emulsifier. In other words, a common curing/crosslinking agent should be suitable for both the crosslinking functionality of the binder as well as the activated unsaturated group(s) of the reactive amphiphatic emulsifier.

As utilized herein, "curing agent" refers to an agent which merely initiates and sustains a crosslinking reaction. Curing agents may be both chemical and non-chemical. Chemical curing agents, such as peroxides, are normally utilized in small amounts with respect to the binder and are not substantially chemically bound into the final reaction product. Non-chemical curing agents include, for example, various forms of radiation such as UV, microwave and heat.

"Crosslinking agents," on the other hand, are substances containing functional groups which react with the crosslinking functionality of the binder and are, as a consequence, incorporated into the final reaction product. Crosslinking agents are generally utilized in relatively large amounts with respect to the binder.

Curing/crosslinking agents for activated unsaturated groups are generally well-known to those skilled in the relevant art.

Preferred crosslinking agents are those that react with activated unsaturated groups via a Michael addition. Such Michael addition crosslinking agents include a wide variety of primary and/or secondary amine groups-containing compounds such as, for example, those disclosed in U.S. Pat. No. 3,291,775, U.S. Pat. No. 4,303,563, U.S. Pat. No. 4,981,944, U.S. Pat. No. 4,990,577 and U.S. Pat. No. 5,011,994. All of these disclosures are incorporated by reference herein as if fully set forth.

Preferred examples of such amine crosslinking agents include (i) aliphatic and/or cycloaliphatic amine compounds containing 2–24 carbon atoms and at least one primary amino group; and (ii) adducts of a molecular weight of 300–1500 of (a) an epoxy, isocyanate and/or α,β-ethylenically unsaturated carbonyl compound and (b) a compound containing at least one primary amino group and a group reacting with the epoxy, isocyanate and/or α,β-ethylenically unsaturated carbonyl compound. More preferably, these amine crosslinking agents contain 2–4 primary amino groups and 0–4 secondary amino groups. Especially preferred of these are, for example, polyether polyamines of the type commercially available under the trade designation "Jeffamine" of Texaco Chemical Company.

Other suitable amine crosslinking agents include monoprimary amine compounds of the general formula (XII):

$$H_2N-(CH_2)_{n6}-NR^8R^9 \quad (XII)$$

wherein n6 is a number from 1 to 4, $R^8$ is selected from an H atom, a $C_1$ to $C_3$ alkyl and a mono-hydroxy substituted $C_1$ to $C_3$ alkyl, and $R^9$ is selected from a $C_1$ to $C_3$ alkyl and a monohydroxy substituted $C_1$ to $C_3$ alkyl, which are disclosed in EP-A-0401898 (corresponding to U.S. application Ser. No. 07/535930), the disclosure of which is also incorporated by reference herein as if fully set forth. Especially preferred of these are, for example, N-ethyl-N-(2-aminoethyl) ethylamine, N-methyl-N-(3-aminopropyl) ethanolamine, N-methyl-N-(2-aminoethyl) methylamine and N-methyl-N-(3-aminopropyl) methylamine.

Still other suitable amine crosslinking agents include polyamino amides such as those disclosed in EP-A-0262720 (corresponding to U.S. Pat. No. 5,112,904), the disclosure of which is also incorporated by reference herein as if fully set forth. The preferred polyamino amides generally comprise an amine number of 60–1000, and are built up from (i) mono- and/or dicarboxylic acids having 2–40 carbon atoms and (ii) polyamine compounds having 2–6 primary amino groups, 0–6 secondary amino groups and 2–20 carbon atoms.

The amine crosslinking agents most preferred for use in the present aqueous coating compositions are those of the general formula (XII) described above.

Oxazolidine compounds, such as disclosed in U.S. Pat. No. 4,373,008 (the disclosure of which is incorporated by reference herein as if fully set forth), are also suitable Michael addition type crosslinking agents.

Other suitable Michael addition type crosslinking agents may be mentioned compounds containing activated methylene groups, for example, acetoacetate and/or malonate group-containing compounds.

Suitable acetoacetate group-containing compounds include lower molecular weight acetoacetates such as trimethylolpropane triacetoacetate, as well as polymeric compounds containing pendant acetoacetate groups such as disclosed in U.S. Pat. No. 4,408,018 (the disclosure of which is incorporated by reference herein as if fully set forth).

Suitable malonate group-containing compounds include polymaleate oligomeric and polymeric esters such as disclosed in U.S. Pat. No. 4,602,061 (the disclosure of which is incorporated by reference herein as if fully set forth).

As suitable combination curing/crosslinking agents for activated unsaturated groups may be mentioned, for example, allyloxy groups-containing compounds such as disclosed in U.S. Pat. No. 4,590,101, AU66/2337, EP-A-0067625 and U.S. Pat. No. 4,145,248, the disclosures of which are all incorporated by reference herein as if fully set forth.

Preferred among these free radical reactive curing/crosslinking agents are those comprising an oligomeric and/or polymeric backbone including a plurality of mer units containing pendant allyloxy groups, such as those of the general formula (XIII):

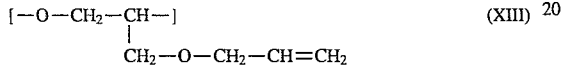

An especially preferred reactive crosslinker of this type is commercially available under the trade designation Santolink XI-100 from Monsanto Chemical Company.

Chemical curing agents for activated unsaturated groups include free-radical initiators such as peroxides and hydroperoxides. These compounds are in general well-known to those skilled in the art and need no specific elucidation. As specific preferred examples, however, may be mentioned cumene hydroperoxide and methylethyl ketone peroxide.

Of course, as indicated above, activated unsaturated groups may be cured utilizing non-chemical curing agents such as UV radiation. See, for example, U.S. Pat. No. 4,382,102, the disclosure of which is incorporated by reference herein as if fully set forth.

Depending upon the type of coating composition and desired application, various other conventional catalyst related additives may also be utilized. For example, if an oxidatively drying coating is desired, any number of well-known driers may be added to the coating composition. As examples may be mentioned metal siccatives such as manganese octoate and cobalt octoate.

The use of these other additives is well-known to those skilled in the art, and need not be elucidated further.

Especially preferred for use with the present invention are the aforementioned amine group-containing crosslinking agents. As such, it is preferred that the binders utilized in the present invention contain functional groups which are reactive with amine groups (amine-reactive functional groups), and especially functional groups which are reactive with amines under ambient temperature conditions (ambient temperature amine-reactive functional groups).

Such functional groups are in general well-known to those skilled in the art and include, for example, one or more of activated unsaturated groups, activated methylene groups, epoxy groups, aromatic activated aldehyde groups (see, e.g., EP-A-0378265), carbonate groups (see, e.g., JP-A-01146968), azlactone groups, oxalate ester groups (see, e.g., U.S. Pat. No. 4,414,250 and DE-A-4036984) and bismaleimides. Preferred of these are activated unsaturated, activated methylene and epoxy groups, which are discussed in detail below.

As examples of generally lipophilic binders containing one or more, and preferably on average at least two, pendant activated unsaturated groups may be mentioned those disclosed in U.S. Pat. No. 4,303,563 (column 5, line 42 through column 7, line 30), U.S. Pat. No. 4,373,008 (column 2, line 54 through column 4, line 47), U.S. Pat. No. 4,382,102 (column 2, line 12 through column 3, line 4), U.S. Pat. No. 4,408,018 (column 2, lines 19–68), U.S. Pat. No. 4,590,101 (column 3, line 29 through column 4, line 12), U.S. Pat. No. 4,602,061 (column 3, lines 14–55), U.S. Pat. No. 4,871,822 (column 3, line 10 through column 4, line U.S. Pat. No. 4,981,944 (column 2, line 23 through column 5, line 36), U.S. Pat. No. 4,990,577 (column 1, line 44 through column 3, line 39), EP-A-0262720 (column 1, line 44 through column 4, line 31) and EP-A-0401898 (page 2, line 49 through page 5, line 24). All of the above not already so are incorporated by reference herein for all purposes as if fully set forth.

Preferred pendant activated unsaturated groups for the binder include groups of the general formulas (IV), (V), (VI) and/or (VII)

wherein $R^4$ is selected from an H atom and a methyl group, $R^5$ is selected from an H atom, a group $R^6$, a group of the formula (VIII) and a group of the formula (IX)

—CH(OH)—CH$_2$—CH$_2$R$_7$ (VIII)

—CH$_2$—CH(OH)—CH$_2$R$^7$ (IX)

$R^6$ is selected from an alkyl group, a cycloalkyl group and an aryl group, which groups may be substituted or not with an alkyl, and $R^7$ is selected from an H atom, a group $R^6$, a group of the formula (X) and a group of the formula (XI)

Examples of suitable binders containing pendant activated unsaturated groups of the formula (IV) include those disclosed in previously incorporated U.S. Pat. No. 4,382,102, U.S. Pat. No. 4,602,061, U.S. Pat. No. 4,990,577, EP-A-0262720 and EP-A-0401898. In general, these binders may be referred to as acryloyl and methacryloyl group-containing binders.

Preferred examples include (i) the acrylic and/or methacrylic esters of di-, tri- and polyvalent polyols such as polyester and polyether polyols; (ii) adducts of an hydroxyl group-containing acrylic and/or methacrylic ester to a compound containing at least two isocyanate and/or epoxy groups; and (iii) adducts of acrylic and/or methacrylic acid to a compound containing at least two epoxy groups. Especially preferred among these are the adducts of acrylic and/or methacrylic acid to the epoxy groups-containing compounds. Further details may be found from the previously mentioned references.

As specific examples of suitable binders containing pendent activated unsaturated groups of the formulas (V), (VI) and (VII) may be mentioned those disclosed in previously incorporated U.S. Pat. No. 4,981,944 and EP-A-0401898. In general, these pendant activated unsaturated groups are derived from maleic acid and anhydride, fumaric acid, and itaconic acid and anhydride.

Preferred examples include (i) adducts of maleic acid (anhydride) and/or itaconic acid (anhydride) to an OH groups-containing polymer, with subsequent reaction (e.g., esterification or neutralization) of at least a portion of remaining carboxyl functionality; (ii) adducts of maleic, fumaric and/or itaconic monoesters to compounds containing at least two epoxy groups; and (iii) adducts of monofunctional epoxy compounds to maleic, fumaric and/or itaconic monoesters, which are subsequently reacted with compounds containing at least two isocyanate groups. Especially preferred among these are the adducts of the maleic and/or itaconic acid (anhydride) to the OH groups-containing polymers. Further details again may be found from the previously mentioned references.

In other aspects, it is preferred that the activated unsaturated group-containing binders possess a number average molecular weight (Mn) in the range of from about 800 to about 100,000, more preferably in the range of from about 800 to about 15,000, and a C=C equivalent weight in the range of from about 400 to about 3000, more preferably from about 500 to about 1500.

As examples of generally lipophilic binders containing one or more, and preferably on average at least two, pendant activated methylene groups may be mentioned those disclosed in U.S. Pat. No. 4,408,018 (column 1, line 51 through column 2, line 6), U.S. Pat. No. 4,602,061 (column 1, line 50 through column 3, line 13), U.S. Pat. No. 4,772,680 (column 1, line 23 through column 2, line 54), U.S. Pat. No. 4,871,822 (column 4, line 34 through column 5, line 9) and U.S. Pat. No. 4,929,661 (column 1, line 32 through column 2, line 69). All of the above not already so are incorporated by reference herein for all purposes as if fully set forth.

Specific examples include compounds obtained by reacting diketene or an alkyl acetoacetate with a polyol having two or more hydroxyl groups, for example, ethylene glycol, propylene glycol, trimethylol propane and pentaerythritol; polyether polyols obtained by reacting an alkylene oxide with a hydroxy compound containing two or more hydroxyl groups; polyester polyols such as polycaprolactone polyols; epoxy resins obtained by reacting epichlorohydrin with a diaryloyl alkane; and acrylic polyols obtained by the addition (co)polymerization of hydroxyl group-containing (meth)acrylic monomers optionally with other addition polymerizable monomers. Such acetoacetate group-containing oligomers/polymers can also be obtained by (co)polymerizing monomer units having one or more acetoacetate groups, for example, the acetoacetate esters of hydroxyalkyl (meth)acrylate or allyl alcohol monomer units. Further details may be found from the previously mentioned references.

Preferred acetoacetate group-containing binders include the polyesters and acrylic polymers produced by (co)polymerizing monomers containing acetoacetate groups, and particularly acrylic (co)polymers obtained by (co)polymerizing acetoacetate esters of hydroxyalkyl (meth)acrylates optionally with other addition polymerizable monomers.

In other aspects, it is preferred that the acetoacetate group-containing binders possess a number average molecular weight (Mn) in the range of from about 1000 to about 100,000, more preferably in the range of from about 1000 to about 10,000, and an acetoacetate equivalent weight of about 200 to about 3000, more preferably from about 400 to 1500.

Examples of generally lipophilic binders containing epoxy groups, and preferably on average at least two epoxy groups, include those disclosed in U.S. Pat. No. 3,945,964 (column 1, lines 13–54), U.S. Pat. No. 4,318,832 (column 2, line 39 through column 3, line 24), U.S. Pat. No. 4,352,898 (column 6, line 42 through column 7, line 17), U.S. Pat. No. 4,598,108 (column 1, line 39 through column 2, line 30), U.S. Pat. No. 4,737,530 (column 1, line 46 through column 2, line 37) and U.S. Pat. No. 4,990,577 (column 2, line 57 through column 3, line 23). All of the above not already so are incorporated by reference herein for all purposes as if fully set forth.

As specific examples of such binders, which may be solid or liquid, may be mentioned the mono-, di- or polyglycidyl ethers of (cyclo)aliphatic or aromatic hydroxyl compounds such as allyl alcohol, butanol, cyclohexanol, phenol, butyl phenol, decanol, ethylene glycol, glycerol, cyclohexanediol, mononuclear di- or trifunctional phenols, bisphenols such as Bisphenol-A or Bisphenol-F, and multinuclear phenols; polyglycidyl ethers of phenol formaldehyde novolacs; polymers of ethylenically compounds with epoxy groups such as glycidyl (meth)acrylate, N-glycidyl (meth)acrylamide and/or allyl glycidyl ether, and optionally one or more other copolymerizable, ethylenically unsaturated monomers; cycloaliphatic epoxy compounds such as epoxidized and optionally successively hydrogenated styrene or divinyl benzene; glycidyl esters of fatty acids containing, for instance, 6–24 carbon atoms; isocyanurate group-containing epoxy compounds; an epoxidized polyalkadiene such as epoxidized polybutadiene; hydantoin epoxy resins; epoxy resins obtained by epoxidizing (cyclo)aliphatic alkenes such as dipentene dioxide, dicyclopentene dioxide and vinylcyclohexene dioxide; and glycidyl groups-containing resins such as polyesters or polyurethanes which contain one or more glycidyl groups per molecule.

Preferred of these include cycloaliphatic epoxy compounds and addition polymers of ethylenically unsaturated compounds containing epoxy groups, such as glycidyl (meth)acrylate and/or allyl glycidyl ether, and optionally one or more other addition polymerizable monomers. Especially preferred are the addition polymers.

As mentioned above, the reactive amphiphatic emulsifiers, when utilized in accordance with the present invention, function as emulsifying agents for these generally lipophilic crosslinkable binders. These reactive amphiphatic emulsifiers comprise a lipophilic backbone having separately pendant therefrom:

(a) at least one activated unsaturated group; and
(b) at least one hydrophilic polyoxyalkylene group selected from
(1) a polyoxyalkylene monoalkylether group of the general formula (I)

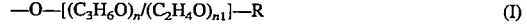

—O—[(C$_3$H$_6$O)$_{n}$/(C$_2$H$_4$O)$_{n1}$]—R    (I)

and (2) a polyoxyalkylene monoamine monoalkylether group of the formula (II)

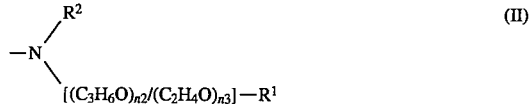

$$-N \begin{matrix} R^2 \\ \diagdown \\ [(C_3H_6O)_{n2}/(C_2H_4O)_{n3}]-R^1 \end{matrix} \quad (II)$$

wherein
R is selected from a C$_1$ to C$_4$ alkyl group,
R$^1$ is selected from an H atom and a C$_1$ to C$_4$ alkyl group, $R^2$ is selected from (i) an alkyl group having 1 to 20 carbon atoms, (ii) the residue of a hydrocarbon having 1 to 20 carbon atoms and a group reactive with a nitrogen, and (iii) a polyoxyalkylene monoether group
of the general formula (III)

$$[(C_3H_6O)_{n4}/(C_2H_4O)_{n5}]-R^3 \qquad (III),$$

$R^3$ is selected from an H atom and a $C_1$ to $C_4$ alkyl group, n, n2 and n4 are independently 0 to 25, n1 is 4 to 40 and n3 and n5 are independently 0 to 40, with the proviso that $4 \leq n+n1 \leq 50$, $4 \leq n2+n3+n4+n5 \leq 50$ and $n3+n5 \leq 4$;

the reactive amphiphatic compound having an HLB value of at least about 6.

Preferred for (I) is the combination of R being a methyl group, n being 1 to 4 and n1 being 10 to 20. Preferred for (II) is the combination of $R^1$ being a methyl group, n2 being from 2 to 4, n3 being from 16 to 20, and $R^2$ being selected from an alkyl group having 1 to 20 carbon atoms, the residue of a monoepoxide having 1 to 20 carbon atoms, the residue of a monoacrylate having 8 to 20 carbon atoms, and a polyoxyalkylene group of the general formula (III) as stated above.

As discussed further below, these hydrophilic polyoxyalkylene groups (I) and/or (II) may be attached to the lipophilic backbone directly and/or via a linking group.

Compounds suitable for use as the lipophilic backbones of the reactive amphiphatic emulsifiers include the same class of compounds previously discussed as suitable for use as the backbone of the generally lipophilic crosslinkable binders. Because the reactive amphiphatic emulsifiers contain pendant activated unsaturation, it is preferred to utilized the same lipophilic backbones as utilized with the activated unsaturated groups-containing binders discussed above. The preferred lipophilic backbones containing the pendant activated unsaturation, therefore, are essentially the same types of compounds disclosed for use as the activated unsaturated group-containing binders. Reference may be had to the above discussion and, more specifically, to previously incorporated references for further details.

Suitable pendant activated unsaturated groups for use with the reactive amphiphatic compounds in accordance with the present invention are, again, the same previously discussed as suitable for the pendant activated unsaturated group-containing binders. Reference again may be had to the above discussion and the just mentioned previously incorporated references for further details.

These pendant activated unsaturated groups may be linked to the lipophilic backbone via the same mechanisms as previously discussed with regard to the pendant activated unsaturated group-containing binders. Once again, reference may be had to this previous discussion as well as to the previously incorporated references for further details.

Except as discussed below, the lipophilic backbones must, in addition to the at least one pendant activated unsaturated group, also contain a reactive group for attachment of the at least one pendant hydrophilic polyoxyalkylene group. As examples of suitable reactive groups may be mentioned pendant active hydrogen containing groups (e.g., carboxyl, hydroxyl and mercapto), pendant epoxy groups, pendant isocyanate groups, and pendant and internal activated unsaturated groups.

The exception is when the lipophilic backbone is formed from compounds already containing groups of the formulas (I) and/or (II), for example, by the (co)polymerization of monomers containing such groups.

The hydrophilic polyoxyalkylene monoalkylether group of the general formula (I) is preferably derived from a polyoxyalkylene monoalkylether of the general formula (IA)

$$HO-[(C_3H_6O)_n/(C_2H_4O)_{n1}]-R \qquad (IA)$$

wherein n, n1 and R are as generally defined above, while the hydrophilic polyoxyalkylene monoamine monoalkylether group of the general formula (II) is preferably derived from a polyoxyalkylene monoamine monoalkylether of the general formula (IIA)

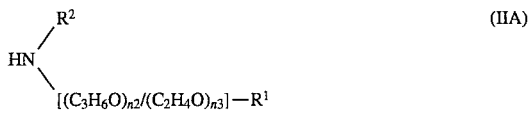

wherein n2, n3, $R^1$ and $R^2$ are generally as defined above.

As mentioned above, the hydrophilic polyoxyalkylene groups (I) and (II) may be attached to the lipophilic backbone directly and/or via a linking group.

For example, these hydrophilic groups may be grafted directly onto the lipophilic backbone via reaction of (IA) and/or (IIA) with an active hydrogen or epoxy group pendant from the lipophilic backbone.

As another example, monomers containing a group of the formula (I) and/or (II) may be (co)polymerized to form an oligomer or polymer wherein the hydrophilic groups (I) and (II) become pendant from a lipophilic backbone.

As yet another example, a group of the formula (II) may be grafted directly onto the lipophilic backbone via the Michael addition of a compound of the general formula (IIA) to at least a portion of the activated unsaturated groups of an activated unsaturated group-containing compound.

As suitable linking groups may be mentioned compounds containing at least two active hydrogen groups, compounds containing at least two epoxy groups and/or compounds containing at least two isocyanate groups, of which the compounds containing epoxy groups are preferred.

The linking is accomplished by reacting one or more compounds of the formulas (IA) and/or (IIA) with a multi-functional linking compound to produce a monofunctional compound, then grafting this monofunctional compound onto the lipophilic backbone via one of the reaction mechanisms discussed above.

An especially preferred option is to graft at least one pendant group of the formula (II) onto the backbone by the Michael addition of a compound of the formula (IIA) onto a portion the pendant activated unsaturation of the lipophilic backbone.

The dispersing agents in accordance with the present invention should comprise sufficient pendant polyoxyalkylene groups of the formulas (I) and/or (II) to result in a compound having an HLB value of at least about 6 to attain effective emulsification, and preferably in the range of from about 6 to about 14, more preferably from about 9 to about 11.

As is well-known, the HLB value is a qualitative characterization of a system and is obtained by the following calculation:

$$HLB = 20 \times \frac{\text{weight of hydrophilic components}}{\text{total weight of hydrophilic and lipophilic components.}}$$

In this formula, the fact that the hydrophilic component of the compound may contain some lipophilic constitutents, and vice versa, is not taken into account.

The aqueous coating compositions in accordance with the present invention may, in general, be formulated according to normal dispersion and/or emulsion techniques utilized in the coatings industry.

The reactive amphiphatic emulsifiers are generally utilized in amounts so as to result in at least about 2.5 parts by weight, preferably from about 5 to about 50 parts by weight, and especially from about 10 to about 30 parts by weight, of polyoxyalkyene groups per 100 parts by weight of the binder plus reactive amphiphatic emulsifier.

The particular choice of curing/crosslinking agent and amount utilized, of course, can vary widely depending on a number of factors including, but not limited to, the particular binder, coating system, application method, substrate and ulitimate use. These and other factors will be appreciated by one skilled in the art, who can choose the proper type and amount of curing agent accordingly.

For example, the amine crosslinking agents are preferably utilized in amounts such that the number of equivalents of functional groups of the binder plus reactive amphiphatic emulsifier to the number of equivalents of amine hydrogen is in the range of from about 1.5 to about 2.5, more preferably in the range of from about 1.8 to about 2.2.

As other examples with respect to activated unsaturated groups-containing binders, the malonate and acetoacetate crosslinking agents are preferably utilized in amounts such that the number of equivalents of activated unsaturated double bonds (binder plus reactive amphiphatic emulsifier) to the number of equivalents of activated methylene hydrogen is in the range of from about 0.25 to about 4, preferably in the range of from about 0.5 to about 2.0.

The oxazolidine crosslinking agents are preferably utilized in amounts such that the number of equivalents of activated unsaturated double bonds (binder plus reactive amphiphatic emulsifier) to the number of equivalents of potential secondary amine nitrogen is in the range of from about 0.2 to about 3.5, more preferably in the range of from about 1.0 to about 2.0.

As another example, the polyallyloxy groups-containing curing/crosslinking agents are preferably utilized in amounts ranging from about 10 wt % to about 50 wt %, based upon the combined weight of the binder and reactive amphiphatic emulsifier.

In addition, the aqueous coating compositions may contain the usual additives such as, for example, pigments, fillers, levelling agents, emulsifiers, anti-foaming agents and other rheology control agents, catalysts, driers, antioxidants, UV stabilizers, anti-sag agents and minor amounts of cosolvent as required, the only limitation being that these additives must be compatible with the other components of the coating composition. This information is well-known and/or readily available to those skilled in the art.

If a co-solvent is utilized, it is preferred that such should be water miscible and utilized in amounts of no more than 10% by weight based upon the aqueous coating composition. As examples of suitable water-miscible cosolvent may be mentioned butyl glycol, isopropyl glycol, butyl diglycol, isopropanol, n-propanol, diacetone alcohol and the like.

The aqueous coating compositions may be formulated to various solids contents, generally ranging from about 20% to about 60%, but desirably in the range of from about 30% to about 55%, depending on the method of application chosen.

The aqueous coating compositions in accordance with the present invention may be applied in any known manner, such as by roller coating, spraying, brushing, sprinkling, flow coating or dipping. It is preferred that the composition should be applied by spraying.

Suitable substrates include those of metals which may be pretreated or not, wood, synthetic materials, paper, glass or leather. Especially preferred are metals such as iron, steel and aluminum, and synthetic substrates such as polyurethanes, polyolefins and polycarbonates, as well as reinforced varieties thereof.

Curing of the coating, of course, depends upon the particular coating, application method and use. Again these factors and others will be appreciated by one skilled in the art, who can readily make the appropriate choice accordingly.

For example, coating compositions including the amine and active methylene crosslinking agents can suitably be cured at low or ambient temperatures, or can be baked at elevated temperatures of from about 60° C. to about 120° C. for accelerated cure.

An especially preferred use of the aqueous coating compositions in accordance with the present invention is in the automobile repair/refinishing industry. When so utilized, it is preferred that the system be ambient temperature curable, especially with the aid of an amine group-containing crosslinking agent. The binder, therefore, should comprise ambient temperature amine-reactive functional groups.

Especially preferred for this use are binders containing at least two pendant activated unsaturated groups which, most preferably, are (meth)acryloyl groups. For further details, reference may be had to the previous discussion and previously incorporated references such as U.S. Pat. No. 4,990,577.

Another preferred use of the aqueous coating compositions in accordance with the present invention is as a primer for various metal substrates. When so utilized, it is again preferred that the system be ambient temperature curable, but with binders containing at least two pendant activated methylene groups. Especially preferred for this use is an acrylic-based binder containing pendant acetoacetate groups. For further details, reference may be had to the previous discussion and previously incorporated references such as U.S. Pat. No. 4,772,.680.

The foregoing general discussion of the present invention will be exemplified by the following examples offered by way of illustration and not limitation on the scope thereof.

EXAMPLES

Preparation of Binder A (BA)

Into a reactor were charged 2073.0 g of xylene, which were heated to boiling temperature. Next, there were added separately, over a period of three hours, a first mixture of 3463.0 g of glycidyl methacrylate, 2831.0 g of styrene, 3676.0 g of butyl acrylate and 521.0 g of decyl methacrylate, and a second mixture of 735.0 g of xylene and 735.0 g of tert. butylperoxy-3,5,5-trimethyl hexanoate.

Thee resulting reaction mixture was kept at boiling temperature until a conversion of over 98% was obtained, at which time a further 400,0 g of xylene were added.

To the composition thus prepared were then added 1528.0 g of acrylic acid, 3.8 g of chromium(III)-2-ethyl hexanoate and 5.0 g of hydroquinone, and the resulting mixture heated to 110° C. with air being passed through until the acid number decreased below 2.

A 79.4% solution of Binder A was thereby obtained, which had an acid number of 0.8 and a C=C equivalent of about 600.

Preparation of Reactive Amphiphatic Compound A (RACA)

To 300.0 g of BA were added 297.8 g of an adduct consisting of equimolar ratios of a polyoxyalkylene monoamine (commercially available under the trade designation Jeffamine M 1000 from Texaco Chemical) and a low molecular weight monoepoxide (commercially available under the trade designation Cardura E from Shell), and 0.5 g of hydroquinone monomethyl ether, and the reaction mixture was kept at 80° C. for seven hours with air being passed through.

The reactive amphiphatic compound thus prepared had a solids content of about 88.6%, an HLB value of about 8.9 and a C=C equivalent weight of about 3300.

Preparation of Emulsion A (EA)

To 500 g of BA were added 78.8 g of RACA, and the mixture stirred until homogeneous. To this were slowly added 588.2 g of demineralized water under vigorous stirring at ambient temperature.

The resulting emulsion had a solids content of about 40% and an organic solvent content of about 9.6%.

EXAMPLES 1–3

Coating compositions were prepared by admixing stoichiometric amounts (1 equivalent ethylenically unsaturated double bond per equivalent active N-hydrogen group) of EA and a crosslinking agent as set forth below in Table I. As crosslinking agents were used:

(1) N-methyl-N-(3-aminopropyl) methylamine, (2) a polyoxyalkylene triamine (commercially available under the trade designation Jeffamine T403 of Texaco Chemical) and (3) 2,2,4-trimethyl hexamethylene diamine.

Panels were coated by applying the coating compositions, immediately after mixing, to glass panels to a wet film thickness of 120 μm using a doctor blade. The panels were stoved for 40 minutes at 90° C.

The cured films on the panels were all clear.

Solvent resistance of the cured films to ethanol (EtOH) and FAM-A (testing fluid for polymer materials according to DIN 51604) was measured by rubbing a 0.5 cm diameter roll of cellulose paper, soaked in the solvent, back and forth (1 D-rub) on the film with about 400 g of pressure. The results after a set number of D-rubs were assessed in accordance with DIN 53230 (0=unchanged, 5=very strongly attacked), and the results presented below in Table 1.

TABLE I

| Example | Cross. | Solvent | No. of D-Rubs | Solvent Resistance |
|---------|--------|---------|---------------|--------------------|
| 1 | (1) | EtOH | 100 | 1 |
|   |     | FAM-A | 100 | 0–1 |
| 2 | (2) | EtOH | 100 | 0–1 |
|   |     | FAM-A | 100 | 0–1 |
| 3 | (3) | EtOH | 100 | 1 |
|   |     | FAM-A | 100 | 1 |

Only a limited number of preferred embodiments of the present invention have been described above. One skilled in the art, however, will recognize numerous substitutions, modifications and alterations which can be made without departing from the spirit and scope of the invention as limited by the following claims.

We claim:

1. An aqueous coating composition comprising (A) a generally lipophilic, crosslinkable binder, (B) optionally, a chemical curing/crosslinking agent for the crosslinkable binder and (C) an emulsifying agent which comprises a reactive amphiphatic emulsifier which has a lipophilic backbone having separately pendant therefrom:

(a) at least one activated unsaturated group; and (b) at least one hydrophilic polyoxyalkylene group selected from the group consisting of (1) a polyoxyalkylene monoalkylether group of the formula (I)

and (2) a polyoxyalkylene monoamine monoalkylether group of the formula (II)

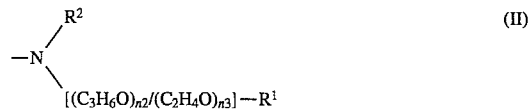

wherein R is selected from the group consisting of a $C_1$ to $C_4$ alkyl group, $R^1$ is selected from the group consisting of an H atom and a $C_1$ to $C_4$ alkyl group, $R^2$ is selected from the group consisting of (i) an alkyl group having 1 to 20 carbon atoms, (ii) the residue of a hydrocarbon having 1 to 20 carbon atoms and having a group reactive with a nitrogen, and (iii) a polyoxyalkylene monoether group of the formula (III)

$R^3$ is selected from the group consisting of a $C_1$ to $C_4$alkyl group, n, n2 and n4 are independently 0 to 25, n1 is 4 to 40 and n3 and n5 are independently 0 to 40, with the proviso that $n+n1 \leq 50$, $4 \leq n2+n3+n4+n5 \leq 50$ and $n3+n5>4$;

the reactive amphiphatic emulsifier having an HLB value of at least about 6.0.

2. The aqueous coating composition according to claim 1, wherein the HLB value is from about 6 to about 14.

3. The aqueous coating composition according to claim 2, wherein the HLB value is from about 9 to about 11.

4. The aqueous coating composition according to claim 1, wherein the pendant polyoxyalkylene group (I) is derived from a polyoxyalkylene monoalkylether of the formula (IA)

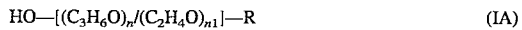

wherein n, n1 and R are defined as in claim 1, and the pendant polyoxyalkylene group (II) is derived from a polyoxyalkylene monoamine monoalkylether of the formula (IIA)

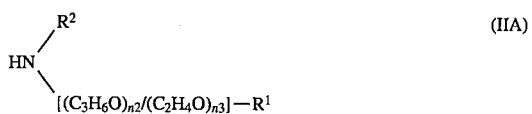

wherein $n_2$, $n_3$, $R^1$ and $R^2$ are defined as in claim 1.

5. The aqueous coating composition according to claim 1 wherein $R^2$ is selected from the group consisting of
   (i) an alkyl group having 1 to 20 carbon atoms,
   (iia) the residue of a monoepoxide compound having from 1 to 20 C atoms,
   (iib) the residue of a monoacrylate having 8 to 20 carbon atoms, and
   (iii) a polyoxyalkylene group of the formula (III).

6. The aqueous coating composition according to claim 1 wherein R is a methyl group, n is 1 to 4 and n1 is 10 to 20.

7. The coating composition according to claim 1, wherein $R^1$ is a methyl group, n2 is from 2 to 4, n3 is from 16 to 20, and $R_2$ is selected from the group consisting of
   (i) an alkyl group having 1 to 20 carbon atoms,
   (iia) the residue of a monoepoxide compound having from 1 to 20 C atoms,
   (iib) the residue of a monoacrylate having 8 to 20 carbon atoms, and
   (iii) a polyoxyalkylene group of the formula (III).

8. The aqueous coating composition according to claim 1, wherein the hydrophilic polyoxyalkylene group (b) is attached to the lipophilic backbone directly, via a linking group, or both directly and via a linking group.

9. The aqueous coating composition according to claim 1, which comprises the reactive amphiphatic emulsifier in an amount such as to result in at least 2.5 parts by weight of polyoxyalkylene groups per 100 parts by weight of the combination of the generally lipophilic binder plus reactive amphiphatic emulsifier.

10. The aqueous coating composition according to claim 9, which comprises the reactive amphiphatic emulsifier in an amount such as to result in from about 5 to about 50 parts by weight of polyoxyalkylene groups per 100 parts by weight of the combination of the generally lipophilic binder plus reactive amphiphatic emulsifier.

11. The aqueous coating composition according to claim 10, which comprises the reactive amphiphatic emulsifier in an amount such as to result in from about 10 to about 30 parts by weight of polyoxyalkylene groups per 100 parts by weight of the combination of the generally lipophilic binder plus reactive amphiphatic emulsifier.

12. The aqueous coating composition according to claim 1, which comprises an amine group-containing compound as crosslinking agent, and wherein the binder comprises amine-reactive functional groups.

13. The aqueous coating composition according to claim 12, wherein the binder comprises ambient temperature amine-reactive functional groups.

14. The aqueous coating composition according to claim 13, wherein the binder comprises on average at least two pendant activated unsaturated groups.

15. The aqueous coating composition according to claim 13, wherein the binder comprises on average at least two activated methylene groups.

16. The aqueous coating composition according to claim 12, wherein the ratio of the number of amine-reactive functional groups of the binder to the number equivalents of amine hydrogen of the crosslinking agent is in the range of from about 1.5 to about 2.5.

17. The aqueous coating composition according to claim 1, which comprises an allyloxy group-containing curing/crosslinking agent.

18. The aqueous coating composition according to claim 17, wherein the binder comprises on average at least two pendant activated unsaturated groups.

19. The aqueous coating composition according to claim 17, wherein the coating composition comprises the allyloxy group-containing curing/crosslinking agent in an amount ranging from about 10 wt % to about 50 wt % based upon the combined weight of the binder and reactive amphiphatic emulsifier.

* * * * *

UNITED STATES PATENT AND TRADEMARK OFFICE
CERTIFICATE OF CORRECTION

PATENT NO. : 5,589,534
DATED : December 31, 1996
INVENTOR(S) : Carl W. Metzger, Bernhard H. Feith, Ute Gruber, Angelika A. Zedler, Mario M.M. van Wingerde It is certified that error appears in the above-indentified patent and that said Letters Patent is hereby corrected as shown below:

ON THE COVER PAGE

"References Cited - U.S. Patent Documents", change "5,141,874" to --5,141,814--.

Claim 1, line 38 (at column 14, line 50) change "n3+n5>4" to --n3+n5$\geq$4--.

Claim 7, line 3 (at column 15, line 19) change "R$_2$" to --R$^2$--.

Signed and Sealed this

Eleventh Day of March, 1997

Attest:

BRUCE LEHMAN

*Attesting Officer*     *Commissioner of Patents and Trademarks*